(12) United States Patent
Ellingson et al.

(10) Patent No.: US 8,833,680 B2
(45) Date of Patent: Sep. 16, 2014

(54) METHOD AND APPARATUS FOR DETECTING A PLUGGED NOZZLE OF A SPRAYER

(75) Inventors: Jon Ellingson, Benson, MN (US); Aaron Tollefsrud, Willmar, MN (US); Bruce Bastin, Starbuck, MN (US)

(73) Assignee: CNH Industrial America LLC, New Holland, PA (US)

( * ) Notice: Subject to any disclaimer, the term of this patent is extended or adjusted under 35 U.S.C. 154(b) by 445 days.

(21) Appl. No.: 12/985,135

(22) Filed: Jan. 5, 2011

(65) Prior Publication Data

US 2012/0168530 A1 Jul. 5, 2012

(51) Int. Cl.
*B05B 3/00* (2006.01)
*B05B 1/20* (2006.01)
*B05B 3/02* (2006.01)
*A01C 23/00* (2006.01)
*B05B 12/00* (2006.01)

(52) U.S. Cl.
CPC ............... *B05B 12/008* (2013.01); *B05B 1/202* (2013.01); *A01C 23/007* (2013.01)
USPC ............ 239/723; 239/172; 239/165; 239/159

(58) Field of Classification Search
USPC ................ 239/71, 72, 74, 146–176, 722–754
See application file for complete search history.

(56) References Cited

U.S. PATENT DOCUMENTS

| 2,907,015 | A | | 9/1959 | Young |
| 4,023,507 | A | | 5/1977 | van der Lely |
| 4,084,748 | A | * | 4/1978 | Anderson et al. ............... 239/74 |
| 4,185,224 | A | | 1/1980 | Thompson |
| 4,193,356 | A | * | 3/1980 | Vehe et al. ..................... 111/118 |
| 4,313,111 | A | | 1/1982 | Anderson |
| 4,562,863 | A | | 1/1986 | Claussen et al. |
| 4,566,342 | A | * | 1/1986 | Kurz .......................... 73/863.03 |
| 4,905,897 | A | | 3/1990 | Rogers et al. |
| 4,917,296 | A | * | 4/1990 | Konieczynski ................... 239/1 |
| 4,986,782 | A | | 1/1991 | Severtson |
| 5,299,594 | A | * | 4/1994 | Lord et al. ............... 137/101.19 |
| 6,855,249 | B2 | * | 2/2005 | Moscaritolo .................... 210/90 |
| 7,311,004 | B2 | | 12/2007 | Giles |
| 7,712,423 | B2 | | 5/2010 | Allan et al. |
| 2007/0237206 | A1 | * | 10/2007 | Kubota et al. ................. 374/164 |
| 2012/0291540 | A1 | * | 11/2012 | Cooke et al. ............... 73/204.11 |

FOREIGN PATENT DOCUMENTS

| EP | 0 322 046 | 6/1989 |
| JP | 02234605 | 9/1990 |

* cited by examiner

*Primary Examiner* — Justin Jonaitis
(74) *Attorney, Agent, or Firm* — Rebecca L. Henkel

(57) ABSTRACT

A plugged nozzle monitoring system uses a thermal flow sensor located within a spray nozzle of an agricultural sprayer. The thermal flow sensor is free of moving parts and is made of corrosion-resistant materials. The thermal flow sensor is placed within the fluid flow path through the nozzle and activates an alarm if flow through the nozzle falls below the baseline value.

18 Claims, 3 Drawing Sheets

METHOD AND APPARATUS FOR DETECTING A PLUGGED NOZZLE OF A SPRAYER

BACKGROUND OF THE INVENTION

The present invention is directed to farm implements and, more particularly, to a plugged nozzle warning system for use with a sprayer of a farm implement.

Field sprayers, as known in the art, are typically towed by a tractor or other towing vehicle and include a fluid holding tank supported by a frame and fluidly coupled to a series of spray nozzles equidistantly spaced from one another along booms extending outwardly from the frame. Crop protection fluid, such as pesticides, or liquid fertilizer are dispensed through the spray nozzles onto the farm field and preferably in an even distribution spray patter so that the fluid is applied consistently across the farm field.

When spraying, or otherwise depositing, fluids onto the farm field, it is important that the spray nozzles are unclogged. If one or more of the nozzles is fully, or partially, clogged, the intended fan angle, pattern, and coverage width will be difficult, if not impossible, to attain. For example, if a nozzle is clogged during the application of a pesticide/herbicide ("chemical solution"), within a few days after the application of the chemical solution, strips of weeds, insects, fungi, and the like will appear on the farm field whereas the portions of the farm field that were covered by unplugged nozzles will be substantially free of the weeds, insects, fungi, and the like. Such a situation requires a farmer to reapply chemical solution to portions of the farm filed where weeds subsequently appear using a smaller sprayer such as an ATV-mounted sprayer or a full size, farm implement mounted sprayer that is set up to apply chemical solution to the weeds. This redundant application of chemical solution ultimately results in twice the application of the chemical solution to some portions of the farm field. In addition to the additional chemical solution cost, there will also be additional fuel costs for the tractor to pull the sprayer across the farm field. Moreover, a farmer can lose confidence in the sprayer's ability to effectively apply the chemical solution and may transfer that lack of confidence to other implements manufactured by the sprayer manufacturer.

Conventionally, sprayers have required the farmer to visually inspect the spray nozzles to determine if any spray nozzle of the sprayer is clogged. Visually inspecting the nozzles is particularly difficult for the farmer to do during an active application of the chemical solution. As such, the farmer must either stop the application process periodically and visually inspect the spray nozzles, which adds to the time requirements for the application process, or must assume that the spray nozzles will not become clogged during the application process. In the case of the latter, it is not uncommon for the spray nozzles to become clogged with dirt and/or debris during the application process and therefore assuming that the spray nozzles will not become plugged is unreliable.

Accordingly, a number of sensor-based systems have been developed that notify the operator if one or more spray nozzles has become plugged. Theses sensors typically rely on moving parts that are moved in response to flow through the spray nozzles. While generally effective, the moving parts can degrade from exposure to the chemical solution and ultimately fail, thereby making such sensors unreliable. One proposed sensor measures a fluid frequency through the nozzle. Since different chemical solutions have different frequency responses, the sensors must be calibrated for each chemical solution. As a single sprayer may be used to apply multiple chemical solutions and the sprayer may have several dozen spray nozzles, requiring calibration of the sensor for each spray nozzle is simply not practical.

There is therefore a need for a reliable flow sensor that is workable with different types of chemical solutions.

SUMMARY OF THE INVENTION

The present invention provides a plugged nozzle monitoring system that uses a thermal flow sensor located within a spray nozzle of an agricultural sprayer. The thermal flow sensor is free of moving parts and is made of corrosion-resistant materials. The thermal flow sensor is placed within the fluid flow path through the nozzle and activates an alarm if flow through the nozzle falls below a baseline value.

It is therefore an object of the invention to provide a reliable flow monitoring system for use with spray nozzles of an agricultural sprayer.

It is another object of the invention to provide a nozzle for use with an agricultural sprayer and having a flow sensor that is substantially free of moving parts.

According to another object of the invention, an improvement for a nozzle of an agricultural sprayer is provided that is usable with sprayers capable of applying different types of chemical solutions onto a farm field or other application surface.

Various other features, objects and advantages of the present invention will be made apparent from the following detailed description and the drawings.

DETAILED DESCRIPTION

Figure 1:
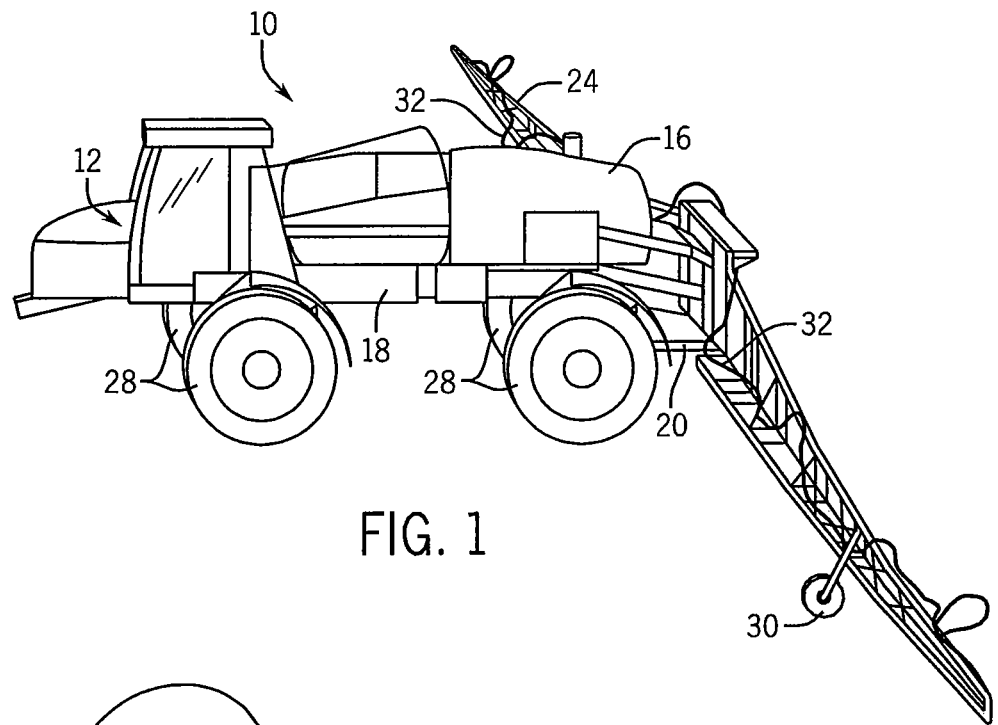
FIG. 1 is a pictorial view of a spraying system incorporating the principles of the present invention.
Figure 2:
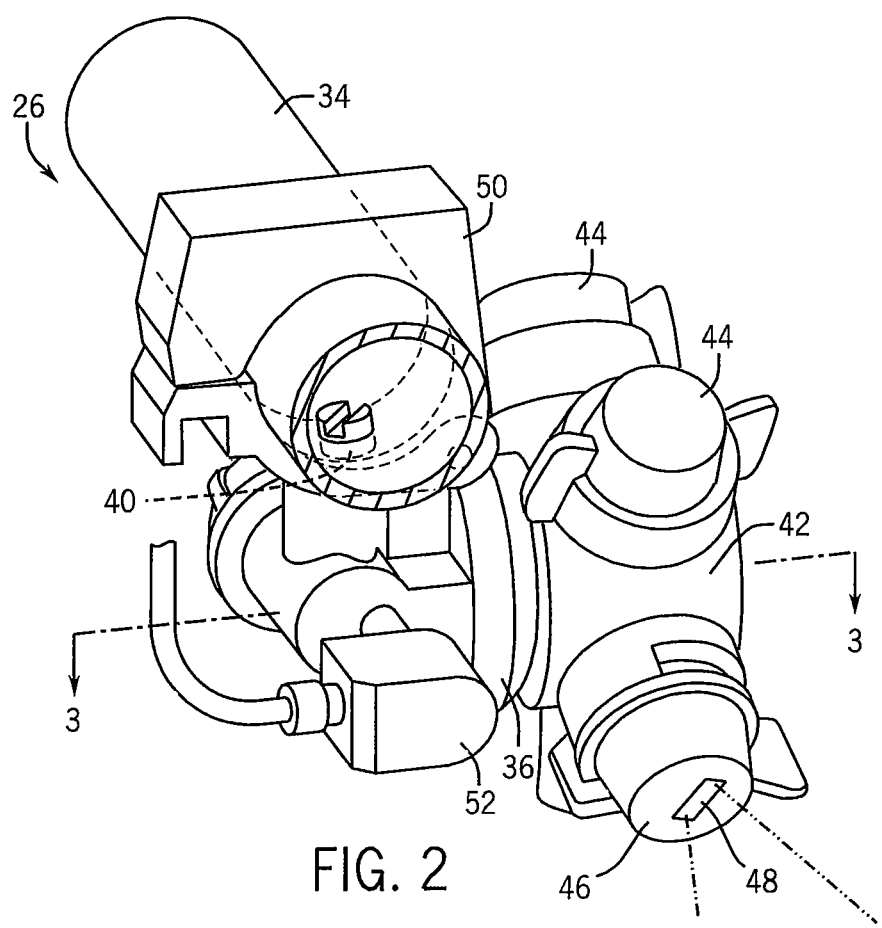
FIG. 2 is an isometric view of a field spray nozzle assembly of the field spraying system of FIG. 1.

FIG. 1 shows an agricultural product application system, which in the illustrated embodiment, is a field spraying system 10 comprised of a self-propelled sprayer 12 having a fluid tank 16 that is supported by a chassis 18 in a known manner. As also known in the art, a rear end 20 of the chassis 18 supports a pair of wing booms 22, 24 to which a series of spray nozzle assemblies 26 are coupled. An exemplary spray nozzle assembly 26 is shown in FIG. 2. The chassis is supported by a set of tires 28 and the wing booms are supported by smaller wheels 30. As known in the art, distribution lines 32 are flow coupled to the fluid tank 16 in a conventional manner, which allows fluid, e.g., fluidized fertilizer, pesticide, herbicide, etc., to be passed to a header 34, FIG. 2, to which the spray nozzle assemblies 26 are coupled.

Figure 3:
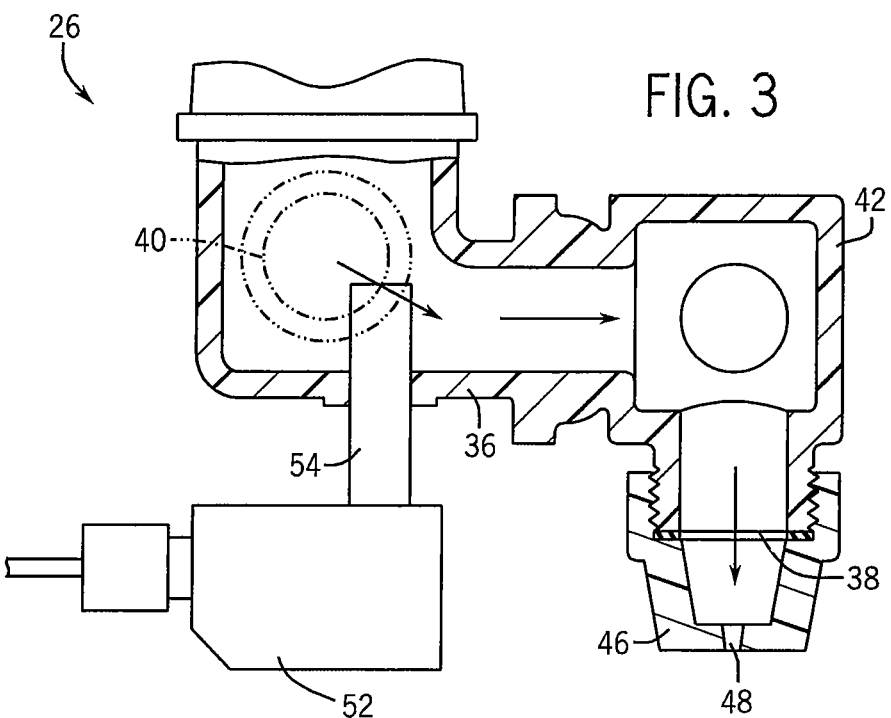
FIG. 3 is a section view of the spray nozzle assembly of FIG. 2 taken along line 3-3 of FIG. 2.

Referring now to FIGS. 2 and 3, an exemplary spray nozzle assembly 26 has a nozzle body 36 fluidly interconnected between five (5) fluid outlet ports 38 and a single fluid inlet port 40. In one implementation, the sprayer 12 has seventy (70) spray nozzle assemblies 26. The outlet ports 38 are circumferentially spaced about manifold 42 which allows fluid to be dispensed from the nozzle assembly 26 at various angular positions as needed for the particulars of a given application. In this regard, in a typical implementation, all but one of the ports will be closed by a cap 44 while one of the ports will be fitted with an orifice cap 46. The orifice cap 46 includes a spray nozzle 48. The orifice cap 46 threads onto the outlet port in a conventional manner and can be easily replaced by other orifice caps having differently configured spray nozzles to allow an operator flexibility in how fluid is applied, such as droplet size, spray pattern, spray width, etc. The spray nozzle assembly 26 uses a conventional clamp 50 for coupling the spray nozzle assembly 26 to the header 34. It is understood that other types of coupling devices may be used to fluidly connect the spray nozzle assembly to the distribution manifold. Also, while a five-way spray nozzle assembly is shown, it is understood that the invention is applicable with other types of spray nozzle assemblies.

Figure 4:
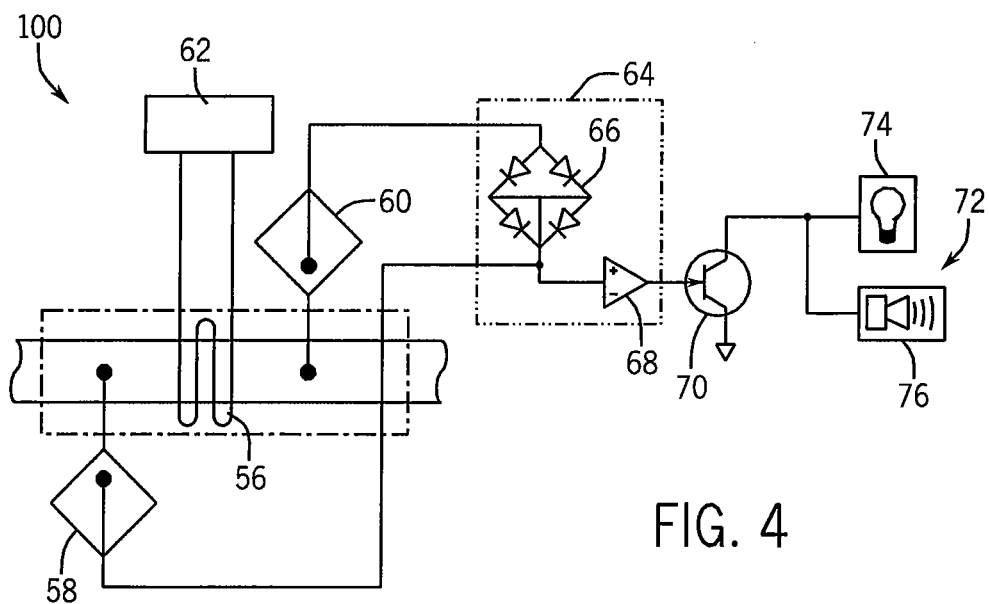
FIG. 4 is a schematic view of a plugged nozzle monitoring and reporting system according to one embodiment of the present invention.

To detect and notify an operator that a spray nozzle is plugged, completely or partially, such as by dirt, debris, or chemical buildup, the present invention provides a remote alert system 100, which is schematically illustrated in FIG. 4, and includes a thermal flow sensor 52 disposed within the nozzle body 36 in the flow path between the fluid inlet port 40 and the spray nozzle 48, as best shown in FIG. 3. The thermal flow sensor 52 is free of moving parts and is thus believed to be more reliable than other types of flow sensors. Moreover, the thermal flow sensor 52 is made of corrosion-resistant materials and is therefore well suited for use with an agricultural sprayer.

With reference to FIGS. 3 and 4, the thermal flow sensor 52 includes a sensor rod 54 having a heating element 56, an upstream temperature sensor element 58 and a downstream temperature sensor element 60. The sensor rod 54 is situated in the nozzle body 36 such that when the spray nozzle is plugged, or substantially plugged, flow past the sensor rod 54 will cease, or substantially flow. The heating element 56 is electrically coupled to a power source 62 so that as current passes through the heating element 56, the fluid passing the sensor rod 54 is heated. Each sensor element 58, 60 measures a temperature of the fluid and provides a corresponding output signal to a circuit block 64 that provides an output voltage signal corresponding to the difference between the temperatures measured by the sensor elements 58, 60. In one embodiment, the circuit block 64 includes a bridge 66 and amplifier 68. The output signal is fed to a switch 70, e.g., MOSFET, that activates an alert in the operator cab of the sprayer 12 when flow through the nozzle body 36 has stopped, or substantially stopped. That is, when the circuit block 64 provides an output voltage that is greater than the threshold voltage of the switch 70, the switch 70 will close and provide an activation signal to an alert 72 for notifying the operator that a spray nozzle is plugged.

In one embodiment, the alert 72 is a light 74 that is caused to be illuminated when flow through the nozzle body has stopped, or has substantially stopped. In one embodiment, the operator cab has a control panel (not shown) having a light for each nozzle assembly of the sprayer 12. Accordingly, when a spray nozzle becomes plugged, the operator is notified of the specific nozzle that has become plugged and can then take measures to service the specific nozzle so that proper flow therethrough can be resumed. It is also contemplated that an audio alarm 76 may be sounded when a spray nozzle is determined to be plugged. The audio alarm 76 is preferably not used to indicate which spray nozzle is plugged but rather alert the operator that any of the spray nozzles are plugged and that the operator should then view the control panel for more information.

Figure 5:
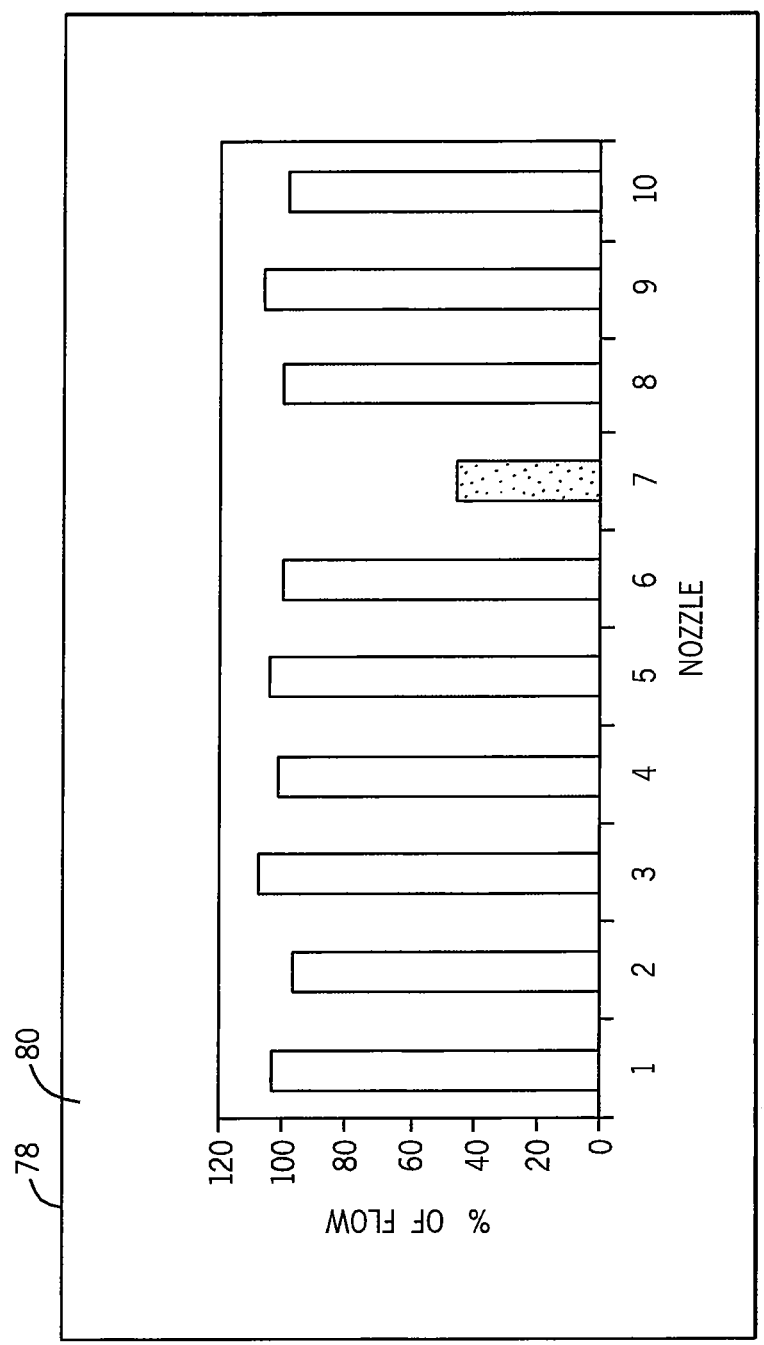
FIG. 5 is a front elevation view of a graphical user interface of the plugged nozzle monitoring and reporting system.

In yet another embodiment, it is contemplated that the sprayer 12 may have an onboard computer or similar processing device and a display unit 78, such as that illustrated in FIG. 5, which provides a graphical user interface 80 that displays the flow rate information for each of the spray nozzles of the sprayer 12. The manner in which the flow rate information is displayed can take many forms, such as average or instantaneous flow rates or, as illustrated in FIG. 5, as a percentage of maximum flow. Color-coding, shading, and other tools may then be used on the GUI 80 to differentiate a spray nozzle that is substantially plugged. For instance, in the example shown in FIG. 5, spray nozzle #7 has a flow rate that is significantly less than a maximum, or desired, flow rate, and as such, the bar reflecting flow rate information for spray nozzle #7 is displayed in a different color than the bar for the other spray nozzles.

Various alternatives and embodiments are contemplated as being within the scope of the following claims particularly pointing out and distinctly claiming the subject matter regarded as the invention.

The invention claimed is:

1. For use with a nozzle of an agricultural sprayer that dispenses a fluid from a fluid source onto an application surface, the improvement comprising:
   a thermal flow sensor disposed within the nozzle at a location upstream of an outlet orifice of the nozzle and substantially within a fluid flow path defined by and within the nozzle, the thermal flow sensor:
      including upstream and downstream flow sensor elements for measuring the temperatures of the fluid flowing therepast; and
      generating an output signal in response to the difference between the temperatures measured by the upstream and downstream flow sensor elements;
   a heating element disposed between the upstream and downstream flow sensor elements for heating the fluid flowing therepast;
   an alert remote from and communicatively linked with the thermal flow sensor, and configured to convey a status of the thermal flow sensor as fluid is being dispensed from the outlet orifice; and
wherein the alert provides an indication notifying an operator that the flow through the nozzle is obstructed in response to the output signal varying from a threshold.

2. The improvement of claim 1 wherein the sensor is made of a metal.

3. The improvement of claim 2 wherein the sensor is made of a rust-resistant, corrosion-resistant material.

4. The improvement of claim 3 wherein the sensor is made of stainless steel.

5. The improvement of claim 1 wherein the alert is located in an operator cab.

6. The improvement of claim 5 wherein the alert illuminates when the velocity of fluid through the nozzle is below the preset limit.

7. The improvement of claim 1 wherein the sensor and the alert are configured to determine and indicate a plugged nozzle without requiring operator inspection of the orifice outlet.

8. A nozzle for an agricultural sprayer, comprising:
   a nozzle body having an inlet for receiving fluid from a fluid source and an outlet for spraying fluid onto an application surface, and wherein a fluid path is defined between the inlet and the outlet;
   a thermal flow sensor aligned in the nozzle body and in the fluid path, the thermal flow sensor including first and second flow sensor elements for monitoring fluid flow through the nozzle body and providing a clogged nozzle output signal when fluid flow through the nozzle body falls below a preset velocity; and a heating element disposed between the first and second flow sensor elements for heating the fluid flowing therepast.

9. The nozzle of claim 8 wherein the sensor has an output lead connected to a remote alert system, and wherein the sensor transmits the clogged nozzle output signal on the output lead to the remote alert system.

10. The nozzle of claim 9 wherein the sensor is made from a corrosion-resistant material.

11. The nozzle of claim 10 wherein the sensor is made from stainless steel.

12. The nozzle of claim 9 wherein the sensor is free of moving parts.

13. A plugged flow warning system for a farm implement having a sprayer that sprays a fluid through a nozzle onto a surface, the system comprising:

an alert in the operator cab that changes states in response to an output signal;

a thermal flow sensor located within the nozzle, the thermal flow sensor:

including first and second flow sensor elements for monitoring fluid flow through the nozzle; and being operative to output a flow condition signal in response to the fluid flow through the nozzle as determined by the first and second flow sensor elements;

a heating element disposed between the flow sensor elements for heating the fluid flowing therepast; and a switch that provides the output signal in response to the flow condition signal.

14. The plugged flow warning system of claim 13 wherein the alert is an audible alert that is sounded in response to the output signal.

15. The plugged flow warning system of claim 13 wherein the alert is a light that illuminates in response to the output signal.

16. The plugged flow warning system of claim 13 wherein the thermal flow sensor is free of moving parts.

17. The plugged flow warning system of claim 13 wherein the thermal flow sensor is formed of stainless steel.

18. The plugged flow warning system of claim 13 wherein the thermal flow sensor is made from corrosion-resistant material.

* * * * *